(12) United States Patent
Lee (10) Patent No.: US 9,190,643 B2
(45) Date of Patent: *Nov. 17, 2015

(54) BATTERY PACK

(71) Applicant: Samsung SDI Co., Ltd., Yongin, Gyeonggi-do (KR)

(72) Inventor: Won-Il Lee, Yongin (KR)

(73) Assignee: Samsung SDI Co., Ltd., Yongin (KR)

( * ) Notice: Subject to any disclaimer, the term of this patent is extended or adjusted under 35 U.S.C. 154(b) by 209 days.

This patent is subject to a terminal disclaimer.

(21) Appl. No.: 13/931,600

(22) Filed: Jun. 28, 2013

(65) Prior Publication Data

US 2014/0220387 A1     Aug. 7, 2014

(30) Foreign Application Priority Data

Feb. 5, 2013  (KR) .......................... 10-2013-0012936

(51) Int. Cl.
| | |
|---|---|
| *H01M 2/34* | (2006.01) |
| *H01M 2/10* | (2006.01) |
| *H01M 10/42* | (2006.01) |
| *H01M 10/48* | (2006.01) |

(52) U.S. Cl.
CPC ............ *H01M 2/1061* (2013.01); *H01M 2/348* (2013.01); *H01M 10/425* (2013.01); *H01M 10/486* (2013.01); *H01M 2200/10* (2013.01)

(58) Field of Classification Search
CPC . H01M 2/348; H01M 2/1061; H01M 10/486; H01M 10/425; H01M 2200/10
USPC .......................................................... 429/7
See application file for complete search history.

(56) References Cited

U.S. PATENT DOCUMENTS

| | | | | |
|---|---|---|---|---|
| 6,524,732 | B1 * | 2/2003 | Iwaizono et al. ................. | 429/7 |
| 8,518,576 | B2 * | 8/2013 | Do ................................ | 429/122 |
| 2003/0162084 | A1 | 8/2003 | Shigeta et al. | |
| 2011/0039132 | A1 * | 2/2011 | Do ................................... | 429/7 |
| 2012/0028084 | A1 * | 2/2012 | Park et al. ........................ | 429/7 |
| 2012/0088135 | A1 | 4/2012 | Kim et al. | |
| 2014/0065448 | A1 * | 3/2014 | Ahn et al. ........................ | 429/7 |
| 2014/0147705 | A1 * | 5/2014 | Wang et al. ...................... | 429/7 |
| 2014/0193670 | A1 * | 7/2014 | Ahn ................................ | 429/7 |
| 2014/0220389 | A1 * | 8/2014 | Lee ................................ | 429/7 |

FOREIGN PATENT DOCUMENTS

| | | |
|---|---|---|
| KR | 2003-0065380 A | 8/2003 |
| KR | 2005-0033707 A | 4/2005 |
| KR | 2011-0030352 A | 3/2011 |

* cited by examiner

*Primary Examiner* — Stewart Fraser
(74) *Attorney, Agent, or Firm* — Knobbe Martens Olson & Bear LLP (57) ABSTRACT

Provided is a battery pack. The battery pack includes; a first battery cell and a second battery cell; a protection circuit module (PCM) that is located between the first and second battery cells and is electrically connected to the first and second battery cells; a thermal sensor that is electrically connected to the PCM and measures a temperature of the first battery cell; and a frame that accommodates the first battery cell, the second battery cell, and the PCM, wherein the frame includes a seating unit on which the PCM is seated, and the seating unit comprises a hole for inserting the thermal sensor to fix a position of the thermal sensor. Accordingly, damage to the thermal sensor is prevented and reliability of the thermal sensor is increased.

21 Claims, 5 Drawing Sheets

BATTERY PACK

CROSS-REFERENCE TO RELATED APPLICATIONS

This application claims the benefit of Korean Patent Application No. 10-2013-0012936, filed on Feb. 5, 2013, in the Korean Intellectual Property Office, the disclosure of which is incorporated herein in its entirety by reference.

BACKGROUND OF THE INVENTION

1. Field of the Invention

One or more embodiments of the present invention relate to battery packs.

2. Description of the Related Art

Due to the development of wireless internet or communication techniques, the use of portable computers, such as tablet personal computers and notebooks that are battery operated has been rapidly increased. Generally, portable computers are widely used for business or personal purposes due to their high mobility since they are small in size and are easy to carry around. In order for a portable computer to be used in various places free from a power supply device, a built-in battery pack may be included. The battery pack may include a secondary battery that may be repeatedly charged and discharged.

A long-term operable battery pack may include a structure for monitoring temperature information of battery cells and for preventing the battery pack from causing an accident such as an explosion by detecting in advance an emergency situation such as an overheating of the battery pack.

SUMMARY OF THE INVENTION

One or more embodiments of the present invention include a battery pack that prevents damage to a temperature sensor that monitors temperature information of battery cells and increases reliability of the temperature sensor.

Additional aspects will be set forth in part in the description which follows and, in part, will be apparent from the description, or may be learned by practice of the presented embodiments.

According to one or more embodiments of the present invention, there is provided a battery pack including: a first battery cell and a second battery cell; a protection circuit module (PCM) that is located between the first and second battery cells and is electrically connected to the first and second battery cells; a thermal sensor that is electrically connected to the PCM and measures a temperature of the first battery cell; and a frame that accommodates the first battery cell, the second battery cell, and the PCM, wherein the frame includes a seating unit on which the PCM is seated, and the seating unit includes a hole for inserting the thermal sensor to fix a position of the thermal sensor.

The frame may include a main frame and first and second ribs that cross the main frame, wherein the seating unit is formed between the first and second ribs and the hole is formed on a boundary region between the seating unit and the first rib.

The seating unit may be formed by shaping some portions of the first and second ribs parallel to the PCM.

The seating unit may include a first groove, the first rib may include a second groove corresponding to the first groove, and the hole may be formed by the first and second grooves.

The seating unit and the first rib may be perpendicular to each other.

The thermal sensor may be connected to the PCM via cables, and the seating unit may include a through groove through which the cables pass.

The main frame may have a rectangular shape, the first and second ribs may be formed parallel to a short side of the main frame, the first battery cell may be accommodated by the main frame and the first rib, and the second battery cell may be accommodated by the main frame and the second rib.

Each of the first battery cell and the second battery cell may include an electrode assembly and a pouch that seals the electrode assembly; the pouch may include a side-wing unit pair and a terrace unit formed by fusion welding, wherein the side-wing unit pair is bent perpendicular to the terrace unit and includes an extension unit that extends on the terrace unit; and each of the first and second ribs may extend in a length direction of the extension unit and may form an insertion unit into which the extension unit is inserted.

The first rib may be shaped to contact a side surface of the first battery cell and may be located on the terrace unit of the first battery cell, and the second rib may be shaped to contact a side surface of the second battery cell and may be located on the terrace unit of the second battery cell.

The thermal sensor may be located on the terrace unit of the first battery cell.

According to one or more embodiments of the present invention, there is provided a battery pack including: a main frame; first and second ribs that cross the main frame and are separated from each other; a first battery cell accommodated by the main frame and the first rib; a second battery cell accommodated by the main frame and the second rib; a protection circuit module (PCM) seated in a seating unit that is formed between the first and second ribs; and a thermal sensor that is electrically connected to the PCM and measures a temperature of the first battery cell, wherein the seating unit is formed by shaping some portions of the first and second ribs parallel to the PCM and the seating unit includes a hole into which thermal sensor is inserted.

The hole may be formed on a boundary region between the seating unit and the first rib.

The seating unit may include a first groove, the first rib may include a second groove corresponding to the first groove, and the hole may be formed by the first and second grooves.

The thermal sensor may be connected to the PCM via the cables, and the seating unit may include a through groove through which the cables pass.

The hole and the through groove may be separated from each other.

The seating unit may include a guide groove that connects the hole and the through groove, and the cables may be separably inserted into the guide groove.

Each of the first battery cell and the second battery cell may include an electrode assembly and a pouch that seals the electrode assembly; the pouch may include a side-wing unit pair and a terrace unit formed by fusion welding, wherein the side-wing unit pair is bent perpendicular to the terrace unit and includes an extension unit that extends on the terrace unit; and each of the first and second ribs may extend in a length direction of the extension unit and forms an insertion unit into which the extension unit is inserted.

The insertion unit may be formed by bending the first and second ribs in a length direction of the extension unit at a location where each of the first and second ribs contacts the main frame.

The first rib may be located on the terrace unit of the first battery cell and the second rib may be located on the terrace unit of the second battery cell.

The first rib may be bent to contact a side surface of the first battery cell and the second rib may be shaped to contact a side surface of the second battery cell.

The PCM may be simultaneously located on the terrace unit of the first battery cell and the terrace unit of the second battery cell, and the thermal sensor may be located on the terrace unit of the first battery cell.

The main frame may have a rectangular shape and the first and second ribs may be formed parallel to a short side of the main frame.

According to the embodiment of the present invention, the falling-out of the thermal sensor is prevented, and thus, the battery pack in which the mounting ability of the thermal sensor is improved may be provided. Since the thermal sensor is protected by disposing in an independent space, damage to the thermal sensor may be prevented, and the thermal sensor is fixed on a specific location, reliability of data measured by the thermal sensor is increased.

Also, since the extension unit of the side-wing unit of the battery cell is inserted into the frame, the manufacture of the battery pack is easy.

Further effects of the present invention besides the effects described above may be induced from the contents to be described hereinafter with reference to drawings.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION OF THE PREFERRED EMBODIMENT

While exemplary embodiments are capable of various modifications and alternative forms, embodiments thereof are shown by way of example in the drawings and will herein be described in detail. It should be understood, however, that there is no intent to limit exemplary embodiments to the particular forms disclosed, but on the contrary, exemplary embodiments are to cover all modifications, equivalents, and alternatives falling within the scope of the invention. In describing the present invention, when practical descriptions with respect to related known functions and configurations may unnecessarily make the scope of the present invention unclear, the descriptions thereof will be omitted.

It will be understood that, although the terms 'first', 'second', etc. may be used herein to describe various elements, these elements should not be limited by these terms. These terms are only used to distinguish one element from another.

The terminologies used herein are for the purpose of describing embodiments only and are not intended to be limiting of exemplary embodiments. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Hereafter, the present invention will be described more fully with reference to the accompanying drawings, in which exemplary embodiments of the present invention are shown.

Figure 1:
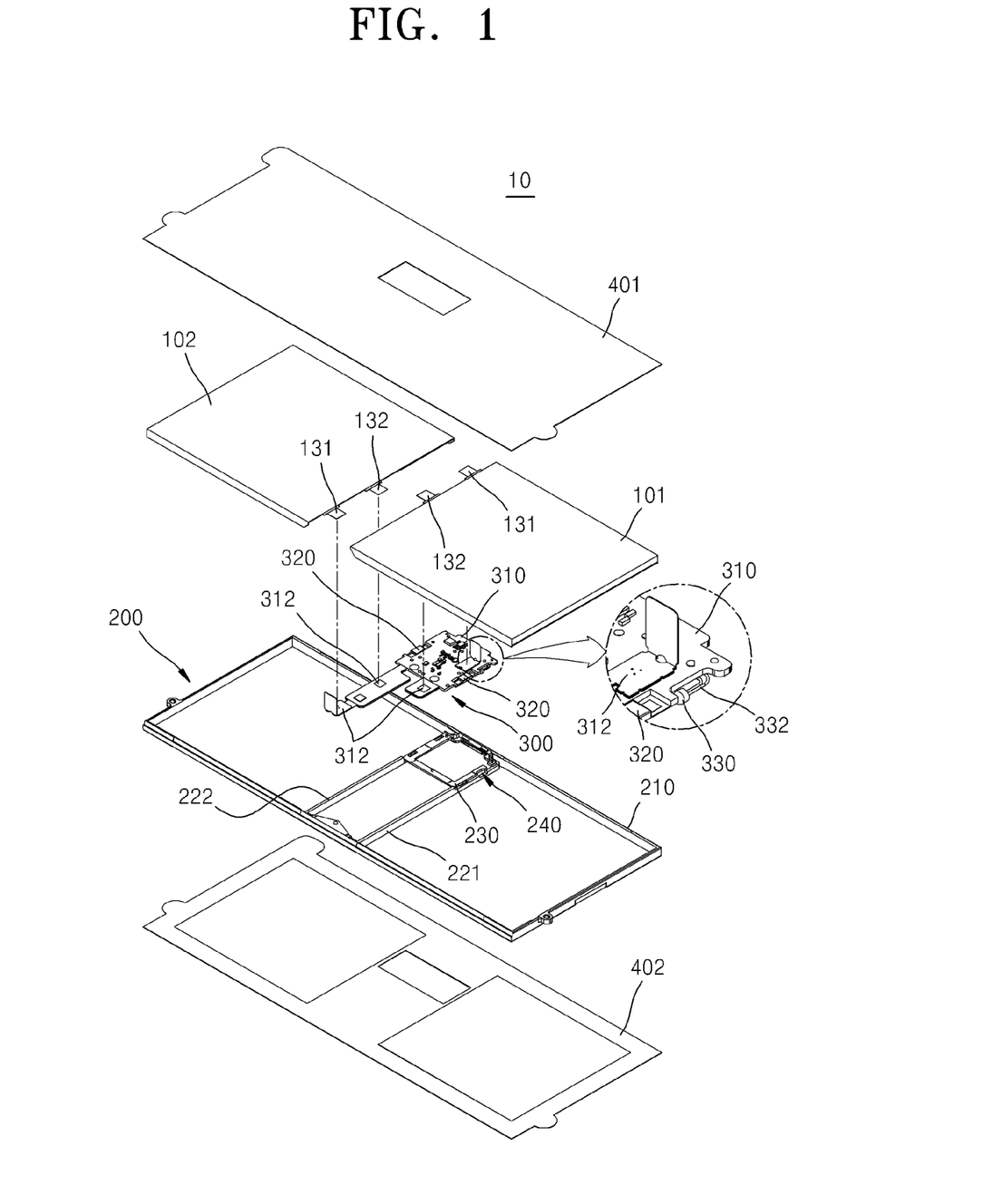
FIG. 1 is a schematic exploded perspective view of a battery pack according to an embodiment of the present invention.
Figure 2:
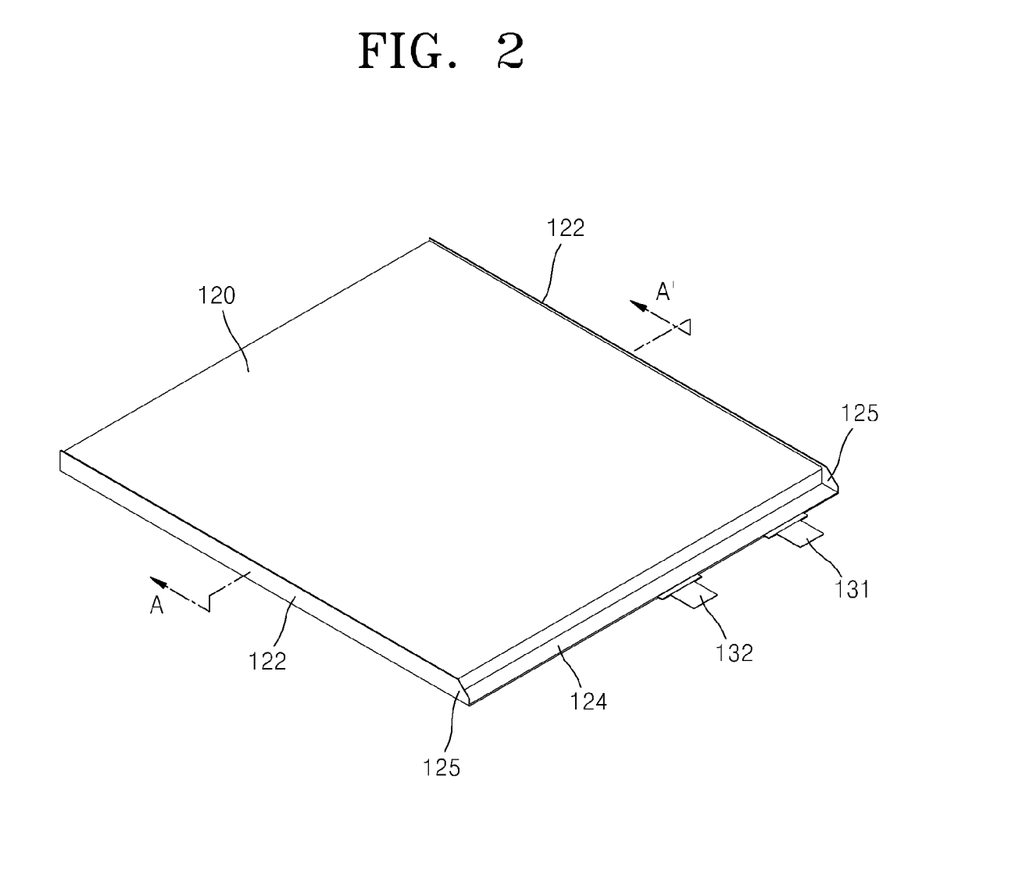
FIG. 2 is an extracted perspective view of a battery cell of the battery pack of FIG. 1.
Figure 3:
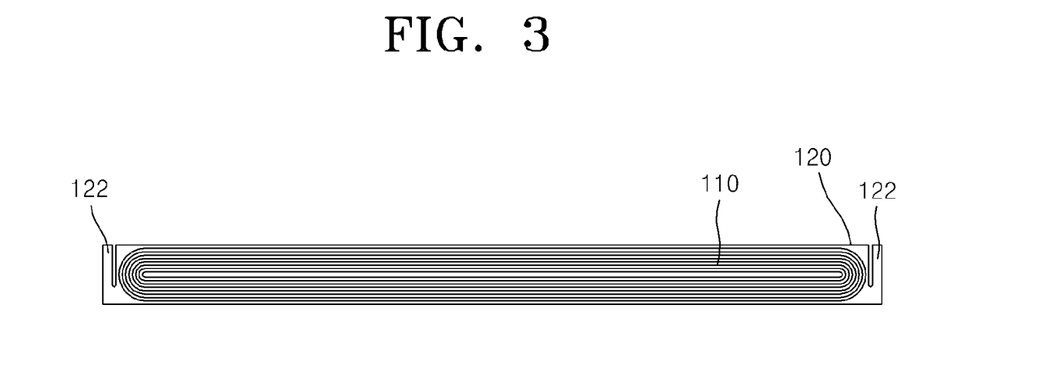
FIG. 3 is a cross-sectional view taken along the line A-A' of FIG. 2.

FIG. 1 is a schematic exploded perspective view of a battery pack 10 according to an embodiment of the present invention. FIG. 2 is a perspective view of a battery cell of the battery pack 10 of FIG. 1. FIG. 3 is a cross-sectional view taken along the line A-A' of FIG. 2.

Referring to FIGS. 1 through 3, the battery pack 10 according to the present invention may include a first battery cell 101, a second battery cell 102, a protection circuit module (PCM) 300, and a frame 200 that accommodates the first battery cell 101, the second battery cell 102, and the PCM 300.

As depicted in FIGS. 2 and 3, each of the first battery cell 101 and the second battery cell 102 may include an electrode assembly 110 and a pouch 120 that seals the electrode assembly 110.

The electrode assembly 110 may be manufactured, for example, in a jelly roll type by winding a stack of an anode plate on which an anode active material is coated, a cathode plate on which a cathode active material is coated, and a separator interposed between the anode plate and the cathode plate. Alternatively, the electrode assembly 110 may be manufactured by repeatedly stacking an anode plate, a separator, and a cathode plate in the stated order.

The pouch 120 may include a side-wing unit pair 122 and a terrace unit 124, which seals the electrode assembly 110 and is formed by fusion welding.

More specifically, when the electrode assembly 110 is accommodated in an accommodating unit (not shown) in which an accommodating space for accommodating the electrode assembly 110 is formed, a cover unit (not shown), a side of which is continuously formed with the accommodating unit (not shown) is folded on the accommodating unit (not shown), and afterwards, the accommodating unit (not shown) and the cover unit (not shown) are fusion welded at an edge of the accommodating space. As a result, the electrode assembly 110 may be sealed, and the edge where the accommodating unit (not shown) and the cover unit (not shown) are fusion welded forms the side-wing unit pair 122 and the terrace unit 124.

The side-wing unit pair 122 and the terrace unit 124 may be bent or otherwise shaped in parallel to a side surface of the first battery cell 101 or the second battery cell 102. Otherwise, the side-wing unit pair 122 may be bent or shaped to contact the side surface of the first battery cell 101 or the second battery cell 102. The bent or shaped side-wing unit pair 122 may extend to the terrace unit 124, and the side-wing unit pair 122 may include an extension unit 125 that is bent on the terrace unit 124.

The extension unit 125 may bend or extend perpendicular to the terrace unit 124 on the terrace unit 124. As a result, the side-wing unit pair 122 that is consecutively formed with the extension unit 125 may be bent or extend perpendicular to the terrace unit 124. Also, the extension unit 125 may be formed with a slope along a length direction of the extension unit 125.

A first electrode tab 131 and a second electrode tab 132 are attached to the electrode assembly 110. The first electrode tab 131 and the second electrode tab 132 are electrically connected to the PCM 300 by being protruded to the outside through the terrace unit 124.

The first battery cell 101 and the second battery cell 102 described above may have an outer line having a quadrangular shape, the frame 200 that accommodates the first battery cell 101 and the second battery cell 102 may have a rectangular shape. In FIG. 1, the battery pack 10 includes the first battery cell 101 and the second battery cell 102. However, the current embodiment is not limited thereto, that is, the battery pack 10 may include a single battery cell or three or more battery cells.

When the battery pack 10 includes the first battery cell 101 and the second battery cell 102 as depicted in FIG. 1, the first battery cell 101 and the second battery cell 102 may be disposed so that the first electrode tab 131 and the second electrode tab 132 respectively included in the first battery cell 101 and the second battery cell 102 face each other, and the PCM 300 may be located between the first battery cell 101 and the second battery cell 102.

The frame 200 may include a main frame 210 that forms an outer unit and first and second ribs 221 and 222 that cross the main frame 210 and are separated from each other. The first and second ribs 221 and 222 divide two accommodating spaces together with the main frame 210 for accommodating respectively the first battery cell 101 and the second battery cell 102.

Also, the frame 200 includes a seating unit 230 where the PCM 300 is seated. The seating unit 230 may include a hole 240 into which a thermal sensor 330 which will be described below is inserted and that fixes a position of the thermal sensor 330. Therefore, the thermal sensor 330 may be prevented from falling out, and thus, the mountability of the thermal sensor 330 may be increased. Since the thermal sensor 330 is disposed and protected in an independent space, damage to the thermal sensor 330 may also be inhibited.

The frame 200 described above may be formed of an insulating material, for example, a thermo-plastic polymer resin. Also, the frame 200 may be formed of a material having elasticity to mitigate impact when the battery pack 10 is dropped or falls.

The frame 200 includes an insertion unit 224 or groove (refer to FIG. 5) into which the extension unit 125 is inserted. Accordingly, the assembly of the battery pack 10 is simplified and a capacity of the battery pack 10 may be increased by increasing sizes of the first battery cell 101 and the second battery cell 102, which will be described below with reference to FIGS. 5 and 6.

The PCM 300 is seated in the seating unit 230 formed between the first and second ribs 221 and 222 and is electrically connected to the first battery cell 101 and the second battery cell 102. According to the current embodiment, the PCM 300 may be electrically connected to the first battery cell 101 and the second battery cell 102 by respectively welding the first electrode tab 131 and the second electrode tab 132 respectively included in the first battery cell 101 and the second battery cell 102 to connection units 312 of the PCM 300.

Although not shown, when the PCM 300 is disposed between the first and second ribs 221 and 222, a cover (not shown) for covering an upper surface and a lower surface of the PCM 300 may be combined with the first and second ribs 221 and 222.

The PCM 300 includes a thermal protection device 320 mounted on the substrate 310, and thus, overheating and explosion due to an overcharging, over-discharging, or an over current flow of the first battery cell 101 and the second battery cell 102 may be prevented or inhibited. The thermal protection device 320 is a device in which conductivity is reversible according to the temperature of the thermal protection device 320, and may prevent an ignition or explosion of the battery pack 10 due to an over current. The thermal protection device 320 may be, for example, a polymeric positive temperature coefficient (PTC) device in which conductive particles such as metal particles or carbon particles are distributed in a crystalline polymer, but is not limited thereto.

The thermal sensor 330 may be attached to the PCM 300. The thermal sensor 330 generates an electrical signal of temperature information at a temperature measuring point and transmits the electrical signal to the PCM 300. For example, the thermal sensor 330 may be a thermistor. More specifically, the thermistor generates an electrical signal corresponding to a temperature of a temperature measuring object, and thus, may be a resistance-type thermistor in which an electrical resistance varies according to the temperature.

The thermal sensor 330 may be disposed parallel to a length direction of the PCM 300. The thermal sensor 330 may be disposed adjacent to at least one of both sides of the PCM 300. In FIG. 1, the thermal sensor 330 is disposed on a right side of the PCM 300 to measure a temperature of the first battery cell 101. However, the current embodiment is not limited thereto, that is, the thermal sensor 330 may be disposed on a left side of the PCM 300.

The thermal sensor 330 described above may monitor a temperature change of the first battery cell 101, and the PCM 300 may control charging and discharging of the first battery cell 101 and the second battery cell 102 in response to a monitoring result of the thermal sensor 330. At this point, an electrical signal generated from the thermal sensor 330 may be transmitted to the PCM 300 via cables 332 that connect the thermal sensor 330 to the PCM 300.

An upper surface and a lower surface of the frame 200 may be an open type, and labels 401 and 402 may be attached to an edge of the frame 200 and the upper surface and the lower surface of the first and second battery cells 101 and 102.

Figure 4:
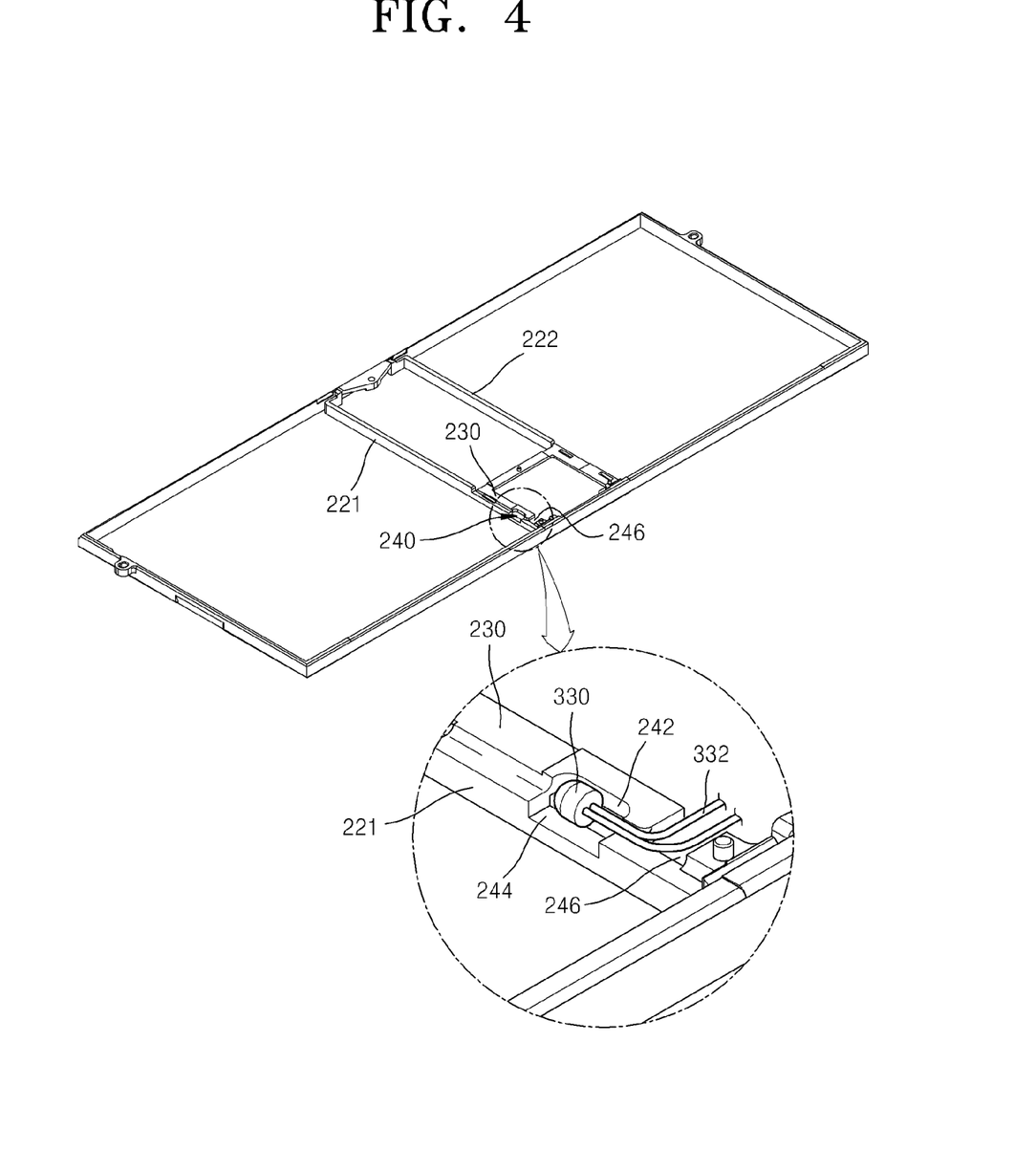
FIG. 4 is a perspective view of a frame of the battery pack of FIG. 1.

FIG. 4 is a perspective view of the frame 200 of the battery pack 10 of FIG. 1. In particular, FIG. 4 shows a case when the thermal sensor 330 is inserted into the hole 240.

Referring to both FIGS. 1 and 4, the frame 200 may include the main frame 210 that forms an outer line of the frame 200 and the first and second ribs 221 and 222 that cross the main frame 210. The main frame 210 and the first and second ribs 221 and 222 may be formed as one-body by using an injection molding.

The main frame 210 and the first and second ribs 221 and 222 may be formed according to the outer line of the first battery cell 101 and the second battery cell 102 to be accommodated.

For example, when the first battery cell 101 and the second battery cell 102 have a quadrangular shape, the main frame 210 may have a rectangular shape, and the first and second ribs 221 and 222 are separated from each other and may be formed parallel to a short side of the main frame 210. Accordingly, the first rib 221 may form a region for accommodating the first battery cell 101 together with the main frame 210, and also, the second rib 222 may form a region for accommodating the second battery cell 102 together with the main frame 210 apart from the region for accommodating the first battery cell 101.

The seating unit 230 is formed between the first and second ribs 221 and 222. The seating unit 230 is a region for seating the PCM 300, and thus, is formed to be able to support an edge of the PCM 300.

For example, the seating unit 230 may be formed by extending some portions of the first and second ribs 221 and 222 in parallel to the PCM 300. At this point, the seating unit 230 may be formed perpendicular to the first and second ribs 221 and 222.

The hole 240 into which the thermal sensor 330 is inserted is formed in the seating unit 230. For example, when the thermal sensor 330 measures the temperature of the first battery cell 101, the hole 240 may be formed on a boundary region between the seating unit 230 and the first rib 221.

More specifically, a first groove 242 is formed in the seating unit 230 in a direction parallel to the seating unit 230, and thus, the thermal sensor 330 may be inserted into the hole 240. Also, a second groove 244 corresponding to the first groove 242 is formed in the first rib 221 in a direction perpendicular to the first groove 242, and thus, the first groove 242 and the second groove 244 together may form the hole 240.

Accordingly, the thermal sensor 330 may be disposed in an independent space, and thus, the thermal sensor 330 may be stably mounted and damage to the thermal sensor 330 may be inhibited. Also, as depicted in FIG. 1, the thermal sensor 330 may be disposed adjacent to a side of the PCM 300, and after the PCM 300 is combined with the frame 200, the first battery cell 101 is combined with the frame 200. At this point, the thermal sensor 330 is located on the terrace unit 124 (refer to FIG. 2) of the first battery cell 101. Accordingly, the thermal sensor 330 may immediately react to the temperature variation of the first battery cell 101, thereby increasing reliability of the thermal sensor 330.

The thermal sensor 330 is electrically connected to the PCM 300 via the cables 332, and thus, a through groove 246 through which the cables 332 pass may be formed in the seating unit 230. The through groove 246 may be separately formed from the hole 240, and the separation distance from the hole 240 may correspond to a bent-length of cables 332. The through groove 246 may be a portion formed by partly cutting the seating unit 230 or a portion in which the seating unit 230 is discontinuously formed.

A guide groove (not shown) that connects the hole 240 and the through groove 246 may be formed in the seating unit 230. The cables 332 may be separably inserted into the guide groove (not shown). That is, when the thermal sensor 330 is inserted into the hole 240, the cables 332 are inserted into the guide groove (not shown) and are connected to the PCM 300 by being bent along the through groove 246, damage to the cables 332 may be prevented.

Figure 5:
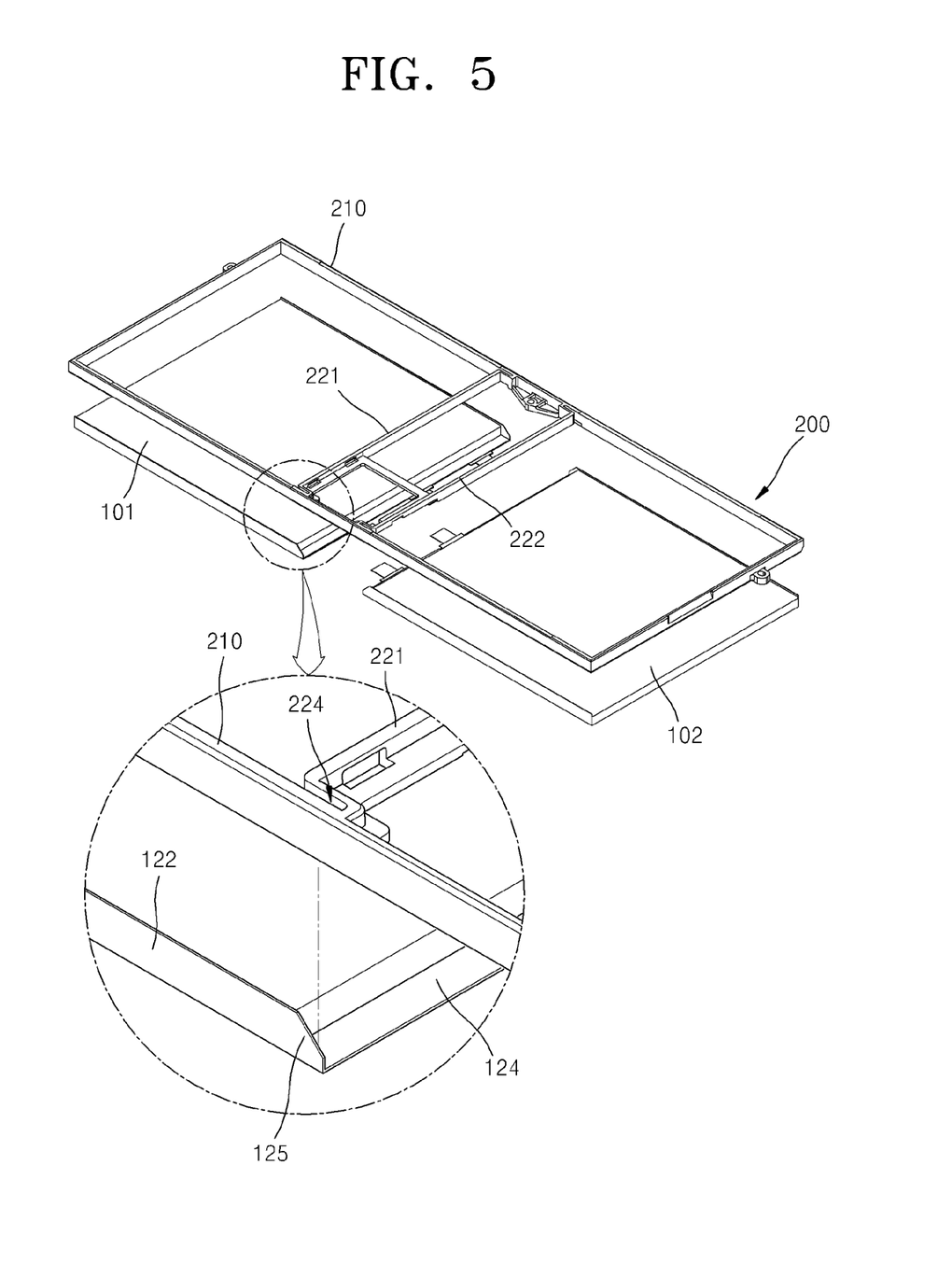
FIG. 5 is a perspective view of the frame and the battery cell of the battery pack of FIG. 1.
Figure 6:
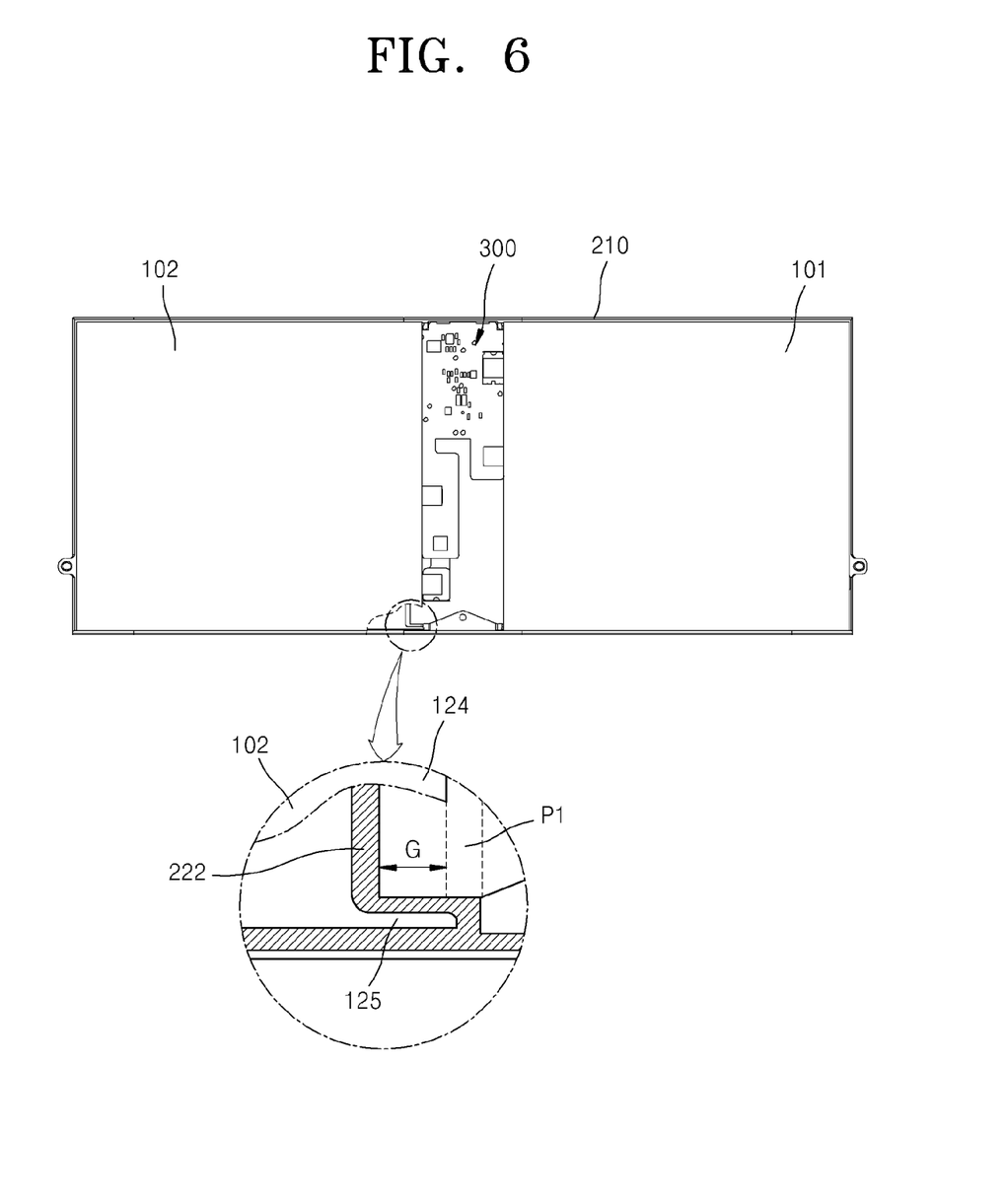
FIG. 6 is a plan view illustrating a state in which the battery cell and a protection circuit module are assembled in the frame of the battery pack of FIG. 1.

FIG. 5 is a perspective view of the frame 200 and the first and second battery cells 101 and 102 of the battery pack 10 of FIG. 1 and FIG. 6 is a plan view illustrating a state in which the first and second battery cells 101 and 102 and PCM 300 are assembled in the frame 200 of the battery pack 10 of FIG. 1.

Referring to FIG. 5, the frame 200 may include the main frame 210 that forms an outer line and the first and second ribs 221 and 222 that cross the main frame 210.

The first and second ribs 221 and 222 respectively accommodate the first battery cell 101 and the second battery cell 102 together with the main frame 210, and the first and second ribs 221 and 222 form an insertion unit 224 or groove into which the extension unit 125 is inserted.

The insertion unit 224 is formed on a location where the first and second ribs 221 and 222 contact the main frame 210. That is, the insertion unit 224 is formed to correspond to the location of the extension unit 125 so that the extension unit 125 that is perpendicularly formed to the terrace unit 124 is inserted. In FIG. 5, since the first and second battery cells 101 and 102 respectively include two extension units 125, there are four insertion units 224 on the frame 200.

In this way, when the insertion units 224 are formed on the first and second ribs 221 and 222, the combination locations of the first and second battery cells 101 and 102 may be readily set when the first and second battery cells 101 and 102 are combined with the frame 200. Therefore, the assembly of the battery pack 10 (refer to FIG. 1) may be easier.

Hereinafter, for convenience of explanation, the configuration of the insertion unit 224 is described in detail by magnifying the insertion unit 224 formed on a side of the first rib 221 that contacts the main frame 210.

Referring to the magnifying portion of FIG. 5, the insertion unit 224 is formed by shaping the first rib 221. More specifically, the insertion unit 224 is formed by shaping the first rib 221 in a length direction of the extension unit 125 of the first battery cell 101 so as to form a groove.

Also, in this manner, the insertion unit 224 is formed on the other side of the first rib 221 that contacts the main frame 210. Accordingly, the first rib 221 is shaped to contact a side surface of the first battery cell 101, and as a result, the first rib 221 is located on the terrace unit 124 of the first battery cell 101.

In this manner, the second rib 222 is also shaped in the length direction of the extension unit 125 of the second battery cell 102, and as a result, the second rib 222 is located on the terrace unit 124 of the second battery cell 102.

In this way, since the first and second ribs 221 and 222 are respectively located on the terrace units 124 of the first and second battery cells 101 and 102, the sizes of the first and second battery cells 101 and 102 may be increased.

FIG. 6 shows a state in which the first and second battery cells 101 and 102 are combined with the frame 200 (refer to FIG. 5) after the PCM 300 is accommodated in the frame 200, and in particular, shows a magnified cut view of a portion of a lower side of the second battery cell 102.

Referring to both FIGS. 5 and 6, as described above, the first and second ribs 221 and 222 are shaped to form the insertion units 224, and each of the first and second ribs 221 and 222 is located on each of the terrace units 124 of the first and second battery cells 101 and 102.

If the second rib 222 is not shaped, the second rib 222 formed across the main frame 210 is needed to be configured to include the extension unit 125 of the second battery cell 102. That is, if the second rib 222 is not shaped, the second rib 222 is located on an imaginary line P1 indicated by dotted lines in FIG. 6, and thus, an area of a region formed by the second rib 222 and the main frame 210 for accommodating the second battery cell 102 may be increased.

In this manner, if the first rib 221 is not shaped, an area of a region formed by the first rib 221 and the main frame 210 for accommodating the first battery cell 101 may be increased.

However, according to the current embodiment, since the first and second ribs 221 and 222 are shaped and the first and second ribs 221 and 222 respectively are located on the terrace units 124 of the first and second battery cells 101 and 102, thus, an area between the first and second ribs 221 and 222 is increased.

The size of the PCM 300 located between the first and second ribs 221 and 222 is fixed. Therefore, the relative sizes of the first and second battery cells 101 and 102 may be increased.

That is, while an overall size of the battery pack 10 (refer to FIG. 1) is identically maintained, the sizes of the first and second battery cells 101 and 102 included in the battery pack 10 may be increased, and accordingly, the capacity of the battery pack 10 may also be increased.

Also, according to the present invention, the battery pack 10 includes the insertion units 224 into which the extension units 125 of the first and second ribs 221 and 222 are inserted. Therefore, when the first and second battery cells 101 and 102 are combined with the frame 200, the combining position of the first and second battery cells 101 and 102 may be readily set, and accordingly, the manufacture of the battery pack 10 (refer to FIG. 1) may be easier.

Also, according to the present invention, the PCM 300 that is located on the seating unit 230 (refer to FIG. 4) formed between the first and second ribs 221 and 222 is simultaneously located on the terrace units 124 of the first and second battery cells 101 and 102. Also, the thermal sensor 330 (refer to FIG. 1) connected to a side of the PCM 300 is inserted into the hole 240 (refer to FIG. 4) formed in the seating unit 230 (refer to FIG. 4), and thus, damage to the thermal sensor 330 may be inhibited.

Also, since the thermal sensor 330 is located on each of the terrace units 124 of the first and second battery cells 101 and 102, temperature variation of the first and second battery cells 101 and 102 may be immediately applied to the thermal sensor 330. Accordingly, the reliability of the thermal sensor 330 is increased, and the stability of the battery pack 10 (refer to FIG. 1) may be increased.

While this invention has been particularly shown and described with reference to preferred embodiments thereof, it will be understood by those of ordinary skill in the art that various changes in form and details may be made therein without departing from the spirit and scope of the invention as defined by the appended claims. The embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A battery pack comprising:
a first battery cell and a second battery cell;
a protection circuit module (PCM) that is located between the first and second battery cells and is electrically connected to the first and second battery cells;
a thermal sensor that is electrically connected to the PCM and measures a temperature of the first battery cell; and
a frame that accommodates the first battery cell, the second battery cell, and the PCM, wherein the frame comprises a seating unit on which the PCM is seated, and the seating unit comprises a hole for inserting the thermal sensor to fix a position of the thermal sensor wherein the frame comprises a main frame and first and second ribs that cross the main frame, wherein the seating unit is formed between the first and second ribs and the hole is formed on a boundary region between the seating unit and the first rib.

2. The battery pack of claim 1, wherein the seating unit is formed by shaping some portions of the first and second ribs in parallel to the PCM.

3. The battery pack of claim 1, wherein the seating unit comprises a first groove, the first rib comprises a second groove corresponding to the first groove, and the hole is formed by the first and second grooves.

4. The battery pack of claim 3, wherein the seating unit and the first rib are perpendicular to each other.

5. The battery pack of claim 1, wherein the thermal sensor is connected to the PCM via cables, and the seating unit comprises a through groove through which the cables pass.

6. The battery pack of claim 1, wherein the main frame has a rectangular shape, the first and second ribs are formed in parallel to a short side of the main frame, the first battery cell is accommodated by the main frame and the first rib, and the second battery cell is accommodated by the main frame and the second rib.

7. The battery pack of claim 6, wherein each of the first battery cell and the second battery cell comprises an electrode assembly and a pouch that seals the electrode assembly;
the pouch comprises a side-wing unit pair and a terrace unit formed by fusion welding, wherein the side-wing unit pair is bent perpendicular to the terrace unit and comprises an extension unit that extends on the terrace unit; and
each of the first and second ribs extends in a length direction of the extension unit and forms an insertion unit into which the extension unit is inserted.

8. The battery pack of claim 7, wherein the first rib is shaped to contact a side surface of the first battery cell and is located on the terrace unit of the first battery cell, and
the second rib is shaped to contact a side surface of the second battery cell and is located on the terrace unit of the second battery cell.

9. The battery pack of claim 7, wherein the thermal sensor is located on the terrace unit of the first battery cell.

10. A battery pack comprising:
a main frame;
first and second ribs that cross the main frame and are separated from each other;
a first battery cell accommodated by the main frame and the first rib;
a second battery cell accommodated by the main frame and the second rib;
a protection circuit module (PCM) seated in a seating unit that is formed between the first and second ribs; and
a thermal sensor that is electrically connected to the PCM and measures a temperature of the first battery cell,
wherein the seating unit is formed by shaping some portions of the first and second ribs in parallel to the PCM and the seating unit comprises a hole into which thermal sensor is inserted.

11. The battery pack of claim 10, wherein the hole is formed on a boundary region between the seating unit and the first rib.

12. The battery pack of claim 10, wherein the seating unit comprises a first groove, the first rib comprises a second groove corresponding to the first groove, and the hole is formed by the first and second grooves.

13. The battery pack of claim 10, wherein the thermal sensor is connected to the PCM via cables, and the seating unit comprises a through groove through which the cables pass.

14. The battery pack of claim 13, wherein the hole and the through groove are separated from each other.

15. The battery pack of claim 14, wherein the seating unit comprises a guide groove that connects the hole and the through groove, and the cables are separably inserted into the guide groove.

16. The battery pack of claim 10, wherein each of the first battery cell and the second battery cell comprises an electrode assembly and a pouch that seals the electrode assembly;
the pouch comprises a side-wing unit pair and a terrace unit formed by fusion welding, wherein the side-wing unit pair is shaped perpendicular to the terrace unit and comprises an extension unit that extends on the terrace unit; and each of the first and second ribs extends in a length direction of the extension unit and forms an insertion unit into which the extension unit is inserted.

17. The battery pack of claim 16, wherein the insertion unit is formed by shaping the first and second ribs in a length direction of the extension unit at a location where each of the first and second ribs contacts the main frame.

18. The battery pack of claim 17, wherein the first rib is located on the terrace unit of the first battery cell and the second rib is located on the terrace unit of the second battery cell.

19. The battery pack of claim 17, wherein the first rib is shaped to contact a side surface of the first battery cell and the second rib is shaped to contact a side surface of the second battery cell.

20. The battery pack of claim 16, wherein the PCM is simultaneously located on the terrace unit of the first battery cell and the terrace unit of the second battery cell, and the thermal sensor is located on the terrace unit of the first battery cell.

21. The battery pack of claim 16, wherein the main frame has a rectangular shape and the first and second ribs are formed parallel to a short side of the main frame.

\* \* \* \* \*